United States Patent
Rangam et al.

(10) Patent No.: US 7,822,121 B2
(45) Date of Patent: Oct. 26, 2010

(54) METHOD AND/OR APPARATUS FOR IMPLEMENTING GLOBAL MOTION COMPENSATION IN A VIDEO SYSTEM

(75) Inventors: Kasturiranga Rangam, Santa Clara, CA (US); Elliot Sowadsky, San Jose, CA (US); Ho-Ming Leung, Cupertino, CA (US)

(73) Assignee: LSI Corporation, Milpitas, CA (US)

( * ) Notice: Subject to any disclaimer, the term of this patent is extended or adjusted under 35 U.S.C. 154(b) by 1241 days.

(21) Appl. No.: 11/082,639

(22) Filed: Mar. 17, 2005

(65) Prior Publication Data
US 2006/0209958 A1  Sep. 21, 2006

(51) Int. Cl.
*H04N 7/12* (2006.01)
(52) U.S. Cl. ............................................. 375/240.16
(58) Field of Classification Search ............ 375/240.16
See application file for complete search history.

(56) References Cited

U.S. PATENT DOCUMENTS

RE39,281 E * 9/2006 Yukitake et al. ......... 375/240.16
2004/0146107 A1 * 7/2004 Sekiguchi et al. ....... 375/240.14

* cited by examiner

*Primary Examiner*—Y. Lee
*Assistant Examiner*—Richard Torrente
(74) *Attorney, Agent, or Firm*—Christopher P. Maiorana, PC

(57) ABSTRACT

An apparatus comprising a video decoder, a video memory and a global motion circuit. The video decoder may be configured to generate a decoded video signal in response to a coded video signal. The video memory may be connected to the video decoder. The global motion circuit may be configured within the video decoder circuit. The global motion circuit may be configured to (i) receive one or more warp points and (ii) generate one or more warping addresses presented directly to the video memory.

20 Claims, 6 Drawing Sheets

● TRUNCATED INTEGER PIXEL POSITION
✕ 1/S RESOLUTION PIXEL POSITION

• 1/S RESOLUTION PIXEL POSITION    NEIGHBORING PIXELS FALL INTO SAME BURST

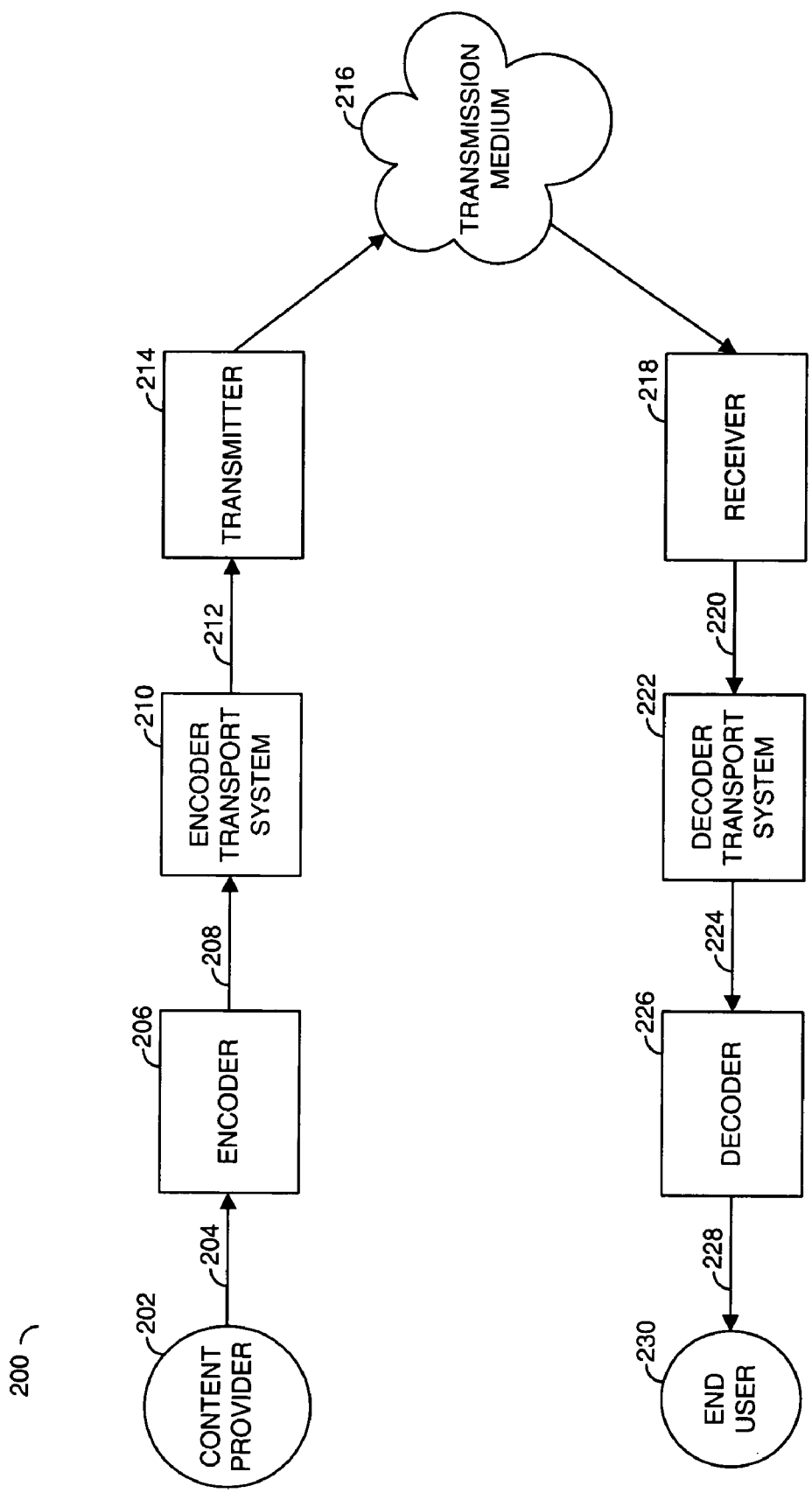

METHOD AND/OR APPARATUS FOR IMPLEMENTING GLOBAL MOTION COMPENSATION IN A VIDEO SYSTEM

FIELD OF THE INVENTION

The present invention relates to video processing generally and, more particularly, to a method and/or apparatus for implementing global motion compensation that may be used in a digital video system.

BACKGROUND OF THE INVENTION

Conventional video approaches typically use software run on a microprocessor to calculate every reference pixel address. Such a microprocessor typically loads a number of reference pixels one by one. Such systems use massive parallel computing hardware to calculate the reference pixel addresses. Computing resources increase the die cost and overall cost of the end product. Conventional approaches do not support global motion compensation.

Conventional approaches using software have low performance, and thus typically only decode small pictures. Massive parallel hardware increases die cost and power consumption. Approaches without global motion compensation support reduce the value of the final product.

It would be desirable to implement a coding system that implements global motion compensation, supports warp points and may be implemented in a combination of hardware and software.

SUMMARY OF THE INVENTION

The present invention concerns an apparatus comprising a video decoder, a video memory and a global motion circuit. The video decoder may be configured to generate a decoded video signal in response to a coded video signal. The video memory may be connected to the video decoder. The global motion circuit may be configured within the video decoder circuit. The global motion circuit may be configured to (i) receive one or more warp points and (ii) generate one or more warping addresses presented directly to the video memory.

The objects, features and advantages of the present invention include providing global motion compensation that may (i) be used in a VLSI system, (ii) implement an optimal hardware/software partition, (iii) calculate global parameters that are fixed for an entire frame by software to reduce hardware, (iv) implement a repetitive part of the process by parallel hardware to increase performance, and/or (v) optimize memory bandwidth and/or internal data bus bandwidth.

BRIEF DESCRIPTION OF THE DRAWINGS

These and other objects, features and advantages of the present invention will be apparent from the following detailed description and the appended claims and drawings in which:

FIG. 9 is a context diagram illustrating a system using the present invention.

DETAILED DESCRIPTION OF THE PREFERRED EMBODIMENTS

Figure 1:
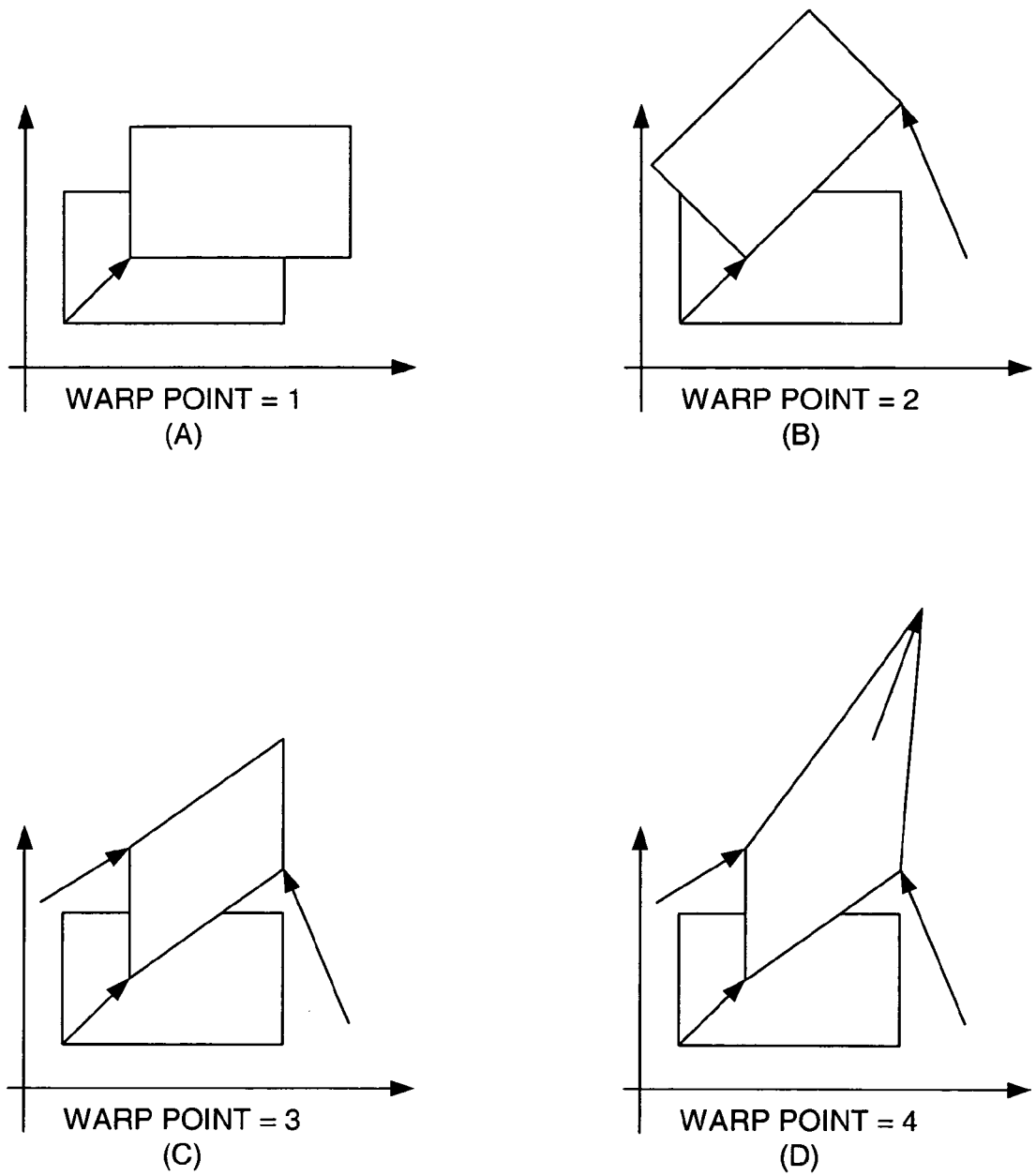
FIGS. 1A-1D illustrate various warp points.

A variety of encoding/decoding systems are used to process video. One coding process is MPEG4, which includes a global motion compensation (GMC) process. The global motion compensation implemented in MPEG4 allows individual macroblocks to use a global motion vector. Another older coding process is MPEG2. MPEG2 lacked global motion vectors. In MPEG4, when a flag (e.g., MCSEL) is set to '1', the reference image would be derived from a global motion compensated image. Otherwise the reference image is generated from a previous reconstructed image. The global motion compensated image is generated by applying an image warping technique to a background image. The warping technique is controlled by "warp points" defined within the bitstream.

MPEG4 supports either 0, 1, 2, 3 or 4 warp points. A global motion compensated image is obtained by translating the Catersian co-ordinates of the current macroblock pixels to the warped co-ordinates of the background images. An example of a background image may be an audience of a tennis match. The background image would not change from frame to frame. However, the background image needs to be warped because the camera remains in a fixed position while being panned or tilted to follow the tennis ball. Since the background image is almost unchanged for a long time, the overall bit rate of an MPEG4 system would be reduced if the majority macroblocks of the image are coded as a warped version of the background image.

Referring to FIGS. 1A-D, a diagram illustrating the warping effect being controlled by a number of warp points is shown. The different views show the effect of a different number of warp points. A single warp point generates the effect of translation (camera panning). A second warp point adds the effect of rotation. A third warp point adds the effect of zooming. A fourth warp point adds the effect of a perspective change. The MPEG4 standard provides a definition for the syntax of four warp points.

A global reference image is defined by 4 reference points and are normally, but not always, restricted to the 4 corners of a rectangle reference image. Since many commercial decoders only support rectangle video frames, most calculations are simplified by using a rectangle. The 4 reference points are defined as:

$(i_0, j_0)$ which may be $(0, 0)$ in a rectangle coded image  (EQ1)

$(i_1, j_1) = (i_0 + W, j_0)$, which is the bottom right corner of the coded image  (EQ2)

$(i_2, j_2) = (i_0, j_0 + H)$, which is the top left corner of the coded image  (EQ3)

$(i_3, j_3) = (i_0 + W, j_0 + H)$, which is the top right corner of the coded image,  (EQ4)

where W and H are the width and height of the coded image.

The MPEG4 specification, the appropriate sections of which are hereby incorporated by reference, defines 4 sprite reference points. These 4 sprite reference points are applied to the global reference image in order to warp the image.

$(i_0', j_0') = (s/2)(2i_0 + du[0], 2j_0 + dv[0]);$  (EQ5)

$(i_1', j_1') = (s/2)(2i_1 + du[1] + du[0], 2j_1 + dv[1] + dv[0]);$  (EQ6)

$$(i_2',j_2')=(s/2)(2i_2+du[2]+du[0], 2j_2+dv[2]+dv[0]);$$ (EQ7)

$$(i_3',j_3')=(s/2)(2I_3+du[3]+du[2]+du[1]+du[0], 2j_3+dv[3]+dv[2]+dv[1]+dv[0])$$ (EQ8)

The equation for $(i_1', j_1')$, $(i_2', j_2')$ and $(i_3', j_3')$ are defined in section 7.8.4 of the MPEG4 specification entitled "Sprite reference point decoding", where du[0] is the horizontal warp vector of warp reference point 0 and dv[0] is the vertical vector. The other warp reference points are defined by (du[1], dv[1]), (du[2], dv[2]) and (du[3], dv[3]) and so on. The "2 $i_0$+du[0]" in equation (EQ5) refers to the warp vectors resolution in ½ pel units. The "s" parameter in equation (EQ5) defines the resolution of the warping, for example:

s=2 when resolution is ½ pel which is defined by sprit_warping_accuracy=0;

s=4 when resolution is ¼ pel which is defined by sprit_warping_accuracy=1;

s=8 when resolution is ⅛ pel which is defined by sprit_warping_accuracy=2;

s=16 when resolution is 1/16 pel which is defined by sprit_warping_accuracy=3.

The resolution of the warping affects how the actual predicted reference data is generated. The concept of warping is similar to normal ½ pel or ¼ pixel interpolation in normal motion compensation. However, the inter pixel grid point could be up to 16. The interpolation is carried out between two integer grid pixels based on the ratio of the distance between the 1/s pel and the integer position pels.

The general formula for warping involves warping a starting pixel location to new location by scaling with the sprite reference point location. The scaling involve dividing by the width (W) and/or the height (H) of the image.

Figure 2:
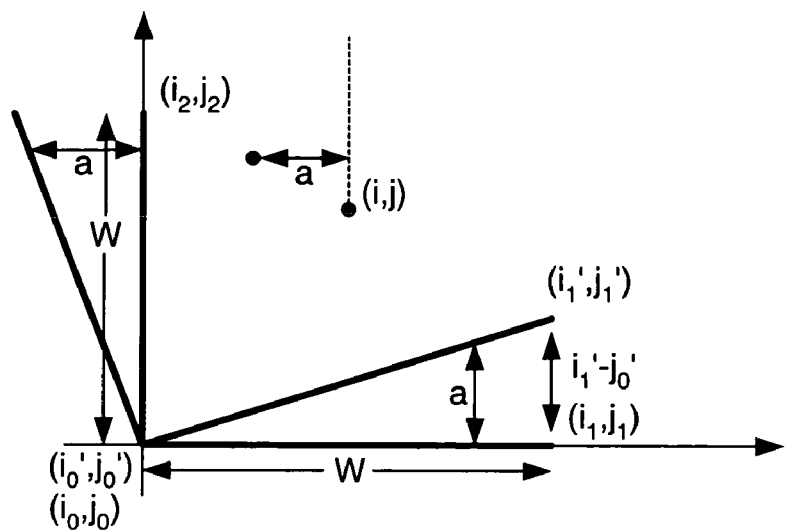
FIG. 2 is a diagram illustrating two warp points.

Referring to FIG. 2, an example of a 2 warp point warping is shown. In this example, the pixel at location (i, j), is defined by current image frame reference co-ordinates of $(i_0, j_0)$, $(i_1, j_1)$, $(i_2, j_2)$ and $(i_3, j_3)$ is being warped by the sprite point of $(i_0', j_0')$, $(i_1', j_1')$, $(i_2', j_2')$ and $(i_3', j_3')$ to the new pixel at location (F, G) of the reference image. Since this is a 2 warp point example, both the point 0 and the point 1 have warp vectors and point 2 and point 3 has zero warp vectors.

Continuing this example $(i_0', j_0')$ and $(i_0, j_0)$ are shown to be on the same location in order to simplify the mathematics. The horizontal position F gets moved from the original i position by 2 factors (i) the movement of $i_1'$ and (ii) the movement of $j_1'$.

The movement caused by $i_1'$ may be defined by the following formula:

$$(i_1'-i_0')*(i-i_0)///W$$ (EQ9)

where /// is defined as rounding to a positive infinite in MPEG4. In MPEG4, $(i-i_0)$ is replaced with a variable I and the equation (EQ9) is re-written as $$(i_1'-i_0')*I///W$$ (EQ10)

This formula may be implemented as a simple scaling of a warped image width $(i_1'-i_0')$ by a ratio of current horizontal displacement (I) ratio over the entire width (W).

The second factor caused by movement of $j_1'$ is slightly more complicated and is shown as component "a" in the above diagrams. This involves projecting the vertical movement "a" as shown on the horizontal axis to the vertical axis.

$$a=-(j_1'-j_0')*J///W$$ (EQ11)

where J is defined as $(j-j_0)$ in MPEG4 spec.

Therefore, the final position F could be expressed as a function of (i, j) by the following formula $$F(i,j)=i_0'+[(-i_0'+i_1')I+(j_0'-j_1')J]///W$$ (EQ12)

Similarly, the vertical index G(i, j) could also be derived. The same principle applied to 3 and 4 warp points to and also the final equations are described in MPEG4 GMC specification.

The equation (EQ12) shows the warping calculation involved in the division operator "///". In order to simplify the mathematical operation, the current image size is normally automatically extended to such a degree that W becomes W' and H becomes H', where W' and H' are the minimum extension of W and H and are integers which could be expressed as:

$$W'=2^{alpha}; H'=2^{beta}$$

For example, an 720×480 image would be extended and become 1024×512. In order to extend the image size, new virtual sprite points are defined. $(i_1', j_1')$ and $(i_2', j_2')$ are replaced by new virtual points of $(i_1'', j_1'')$ and $(i_2'', j_2'')$. These 2 points are defined in MPEG4 specification as:

$$(i_1'',j_1'')=(16(i_0+W')+[(W-W')(ri_0'-16i_0)+W'(ri_1'-16i_1)]//W,$$

$$16j_0+[(W-W')(rj_0'-16j_0)+W'(rj_1'-16j_1)]//W)$$ (EQ13), $$(i_2'',j_2'')=(16i_0+((H-H')(ri_0'-16i_0)+H'(ri_2'-16i_2)]//H,$$ and $$16(j_0+H')+((H-H')(rj_0'-16j_0)+H'(rj_2'-16j_2)]//H)$$ (EQ14)

By substituting the equations (EQ13) and (EQ14) into (5) to (EQ12), these equations could be simplified as following:

$$(i_1'',j_1'')=(ri_0'+16W'+8du[1]W'//W, rj_0'+8dv[1]W'//W);$$ (EQ15)

$$(i_2'',j_2'')=(ri_0'+8du[2] H'//H, rj_0'+16H'+8dv[2]H'//H);$$ (EQ16)

where $r=16/s$ (EQ17)

While the equations (EQ15) and (EQ16) are not shown in the original MPEG4 specification, equations EQ15 and 16 explain the virtual warp concept beyond the explanation in the specification. The equations EQ15 and EQ16 accomplish (i) conversion of all of the variable resolutions from s to 16 and (ii) extending the original warp vectors du[ ] and dv[ ] by scaling it with (W'//W) or (H'//H). The virtual warp points preserve the general shape of the warping by extending the W and H and scaling the warp vectors by same amount.

The conversion from s to 16 resolution simplifies the implementation as all of calculating is done at 1/16 resolution regardless the original resolution. For example, (r $i_0'$, r $j_0'$) multiplies the warp point 0 (in resolution of s) by a factor of r so that the final resolution is 16, as r=16/s defined in equation (EQ16).

(8 du[1] W'//W) scales the du[1] by W'//W. The constant 8 is generated from the equation because warp vectors have ½ pel resolution as shown in equation (5) and increases 8 times when resolution becomes 16.

Using virtual warp point 1 and 2 $((i_1'', j_1'')$ and $(i_2'', j_2''))$ instead of original warp points would simplify the operation as the divide operator (///W) and (///H) could be replaced by simple right shift operations of (>>alpha) and (>>beta), because of power of 2 relationship of H' and W'. The final warping operations, simplified by the virtual warp point are described in MPEG4 spec. However, there seems to be no simplification for the warp point of 4.

For one warp point, the warping operation is simply a normal load strip operation with special r/s sub-pel interpolation as shown in FIG. 7-31 of the MPEG4 specification. Warp vector 0 may be implemented by adjusting the row and column offset of the strip transfer.

Two warp points may be implemented by using warp point of 3 formula and setting the unused warp vectors as following:

$$du[2]=-dv[1]$$

$$dv[2]=du[1]$$

The hardware for 3 warp points may be re-used for a 2 warp point implementation, with software setting the un-used warp 2 vectors as described in above equations.

Figure 3:
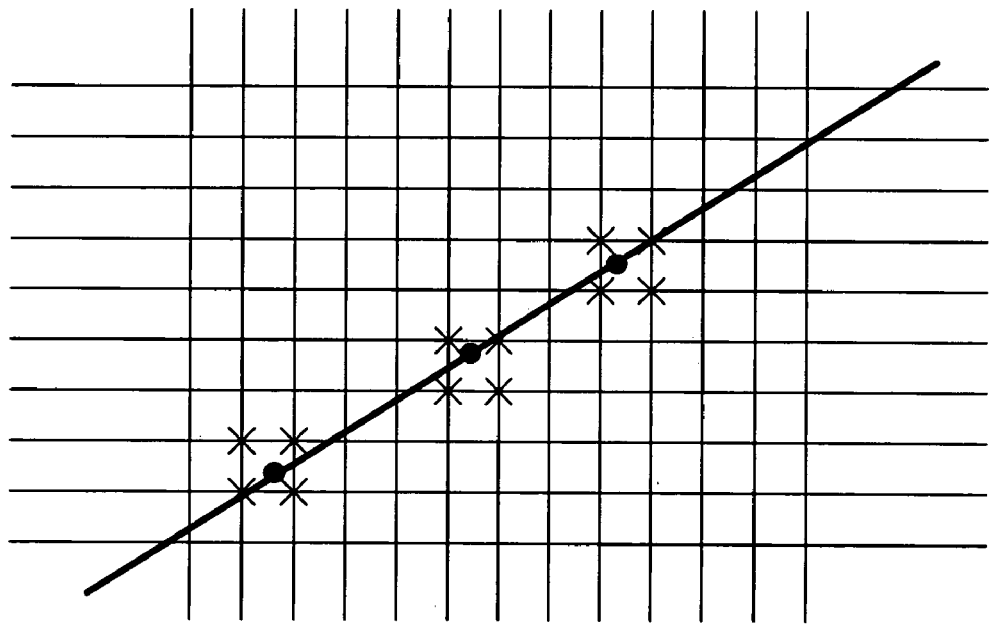
FIG. 3 is a diagram illustrating the mapping of 1/s resolution pixels to higher position pixels.

Referring to FIG. 3, an example of mapping of 1/s resolution index back to an integer position index is shown. The pixel index (F(i,j), G(i,j)) are in 1/s resolution where s is 2, 4, 8 or 16. The reconstructed predicted pixel is obtained by interpolating the 4 closest integer position pixels. The 4 closest integer index position pixels may be defined as:

$$(F(i,j)////s,G(i,j)////s),$$

$$(F(i,j)////s+1,G(i,j)////s),$$

$$(F(i,j)////s,G(i,j)////s+1), \text{ and}$$

$$(F(i,j)////s+1,G(i,j)////s+1),$$

where "////" is just a simple truncate toward to negative infinite as defined in MPEG4 specification.

The sub-pel interpolation is the ratio of the distance between the integer and the sub-pel position and the equation, as defined in the MPEG4 specification.

Figure 4:
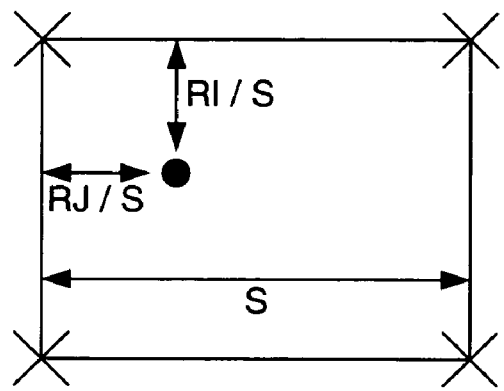
FIG. 4 is a diagram of sub-pel position interpolation.

Referring to FIG. 4, a diagram of sub-pel position interpolation is shown, where ri an rj are simply the distance defined as:

$$ri=(F(i,j)-(F(i,j)////s)s;$$

$$rj=(G(i,j)-(G(i,j)////s)s.$$

After a warping operation, the re-mapped integer pixels could be far apart if the warp vectors are large. This would break the SDRAM page boundary and result in loss of bandwidth. Some of the integer pixels could be shared among different sub-pel interpolations and thus the total number of pixels returned to the video digital signal processor (VDSP) would be dependent of warping vectors magnitude and various. The addresses of the interpolated pixels and thus the sub-pel interpolation ratio, vary within every pixel inside the macroblocks. These addresses need to be communicated between the SDRAM controller 104 and the VDSP 132. The bandwidth needed to send the addresses may be larger than the data bandwidth.

Figure 5:
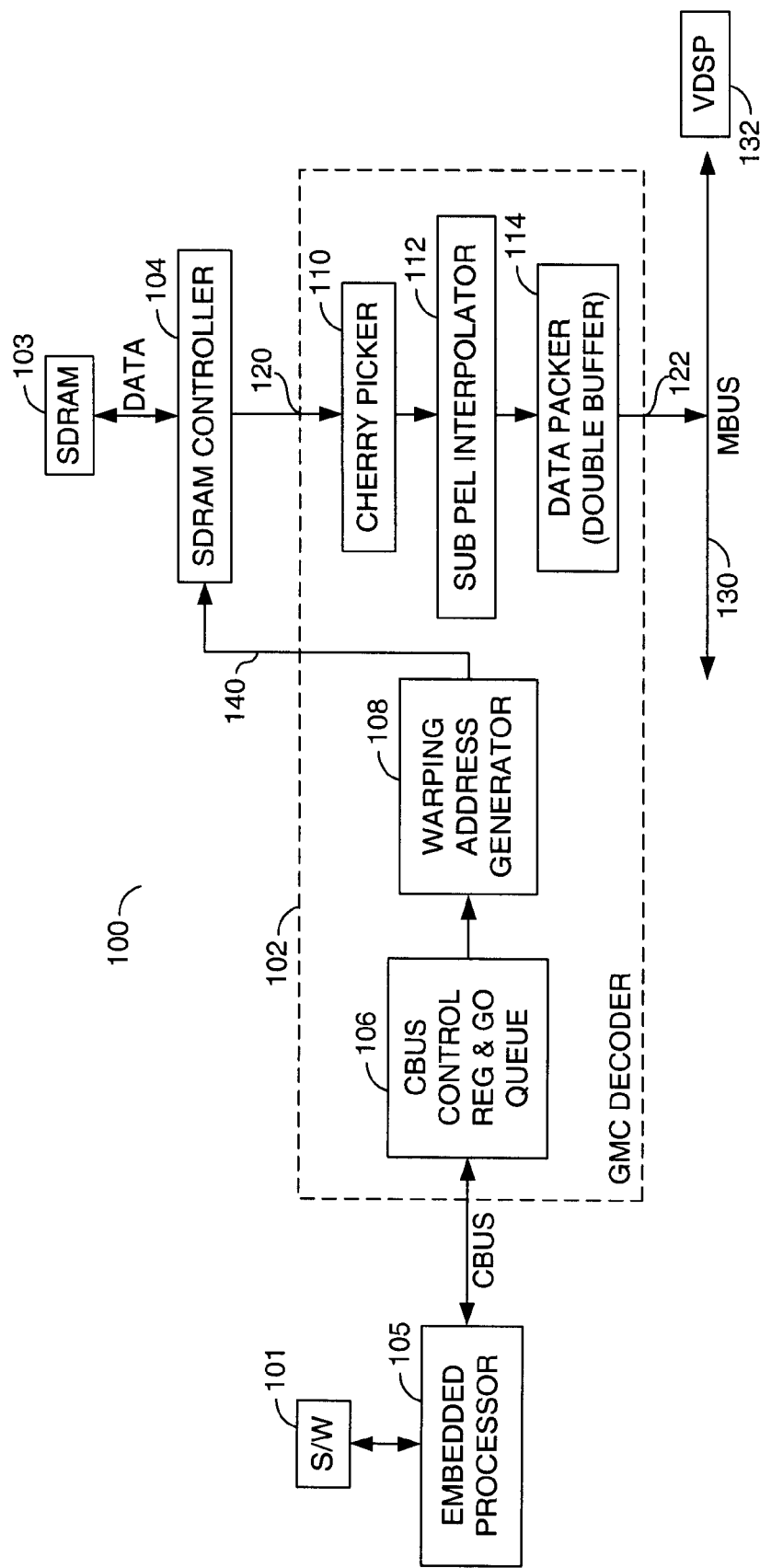
FIG. 5 is a diagram of a decoder architecture.

Referring to FIG. 5, a system 100 is shown in accordance with the present invention. The system 100 generally comprises a software block 101, a decoder block (or circuit) 102 a memory block (or circuit) 103, a controller (or circuit) 104 and an embedded processor (or circuit) 105. The software 101 may run on a computer readable medium stored either internally or externally to the embedded processor 105. The memory block 103 may be implemented as an external synchronous dynamic random access memory (SDRAM). The controller 104 may be implemented as a SDRAM controller. The SDRAM controller 104 may receive/present the signal (e.g. DATA) to/from the SDRAM 103. The SDRAM controller 104 may handle a SDRAM control protocol and transfer data on the signal DATA between the SDRAM 103 and an internal SDRAM bus (not shown).

The decoder generally comprises a block (or circuit) 106, a block (or circuit) 108, a block (or circuit) 110, a block (or circuit) 112 and a block (or circuit) 114. The block 106 may control the registers in queuing of the decoder 102. The block 108 may control the generation of the warp addresses. The block 110 may be referred to as a "cherry picker". The block 110 processes relatively easily processed pixels. The block 112 may be implemented as a sub-pel interpolator. The block 114 may be implemented as a data packer, such as a double buffer data packer. The decoder 102 may have an input 120 that receives data from the controller 104. The decoder 102 may also have an output 122 that may present data to a bus 130. The controller 102 may receive/present data over the control bus CBUS to/from the embedded processor 105.

The system 100 may optimally support warp points of 1 to 3. The system 100 may also support warp point of 4 with additional modifications. Since warp point 4 may need complicated mapping logic, the system 100 may be more easily implemented by limiting support to warp points 1 to 3.

The proposed architecture of the circuit 102 may be implemented outside the processing of a typical video digital signal processor 132. The block 102 may be implemented as part of the SDRAM controller module and may communicate directly with the SDRAM controller circuit 104 through a bus 140.

The block 106 may provide a control bus register for programming a number of parameters, such as the number of warp points. The block 106 may be mapped to a control bus address space programmed by the embedded processor 105. Support is also provided for a reference frame SDRAM address base, row, column offset.

The operation of the address generation circuit 108 may be started by programming these parameters and then setting a "GO" bit. The hardware in the circuit 108 may be configured to provide a four deep GO queue. The luma bit and the chroma bit use 2 different formulas and parameters. The extra third and fourth queue enable the overlapping of the current macroblock GMC motion compensation data load and the next macroblock GMC setup. Using 2 different formulas for the luma bit and the chroma bit is supported in MPEG4, since the luma and chroma data have different resolutions resulting in a different warping address calculations. The warp vectors are not part of the GO queue since they would typically not be changed for the entire frame. The reference frame SDRAM address row and column offset would normally be changed from macroblock to macroblock.

After the completion of the luma GMC operation, the individual sub-pel address (e.g., horizontal and vertical address) displacement from the base address would be accumulated and stored in the register 106. In MPEG4, if the neighbor pixels are GMC based, then the average of the individual pixel motion vectors is normally used as a final motion vector for motion vector prediction. An embedded processor may read the register 106 and record the average motion vector for future use.

In general, there is no need to check the GO queue for fullness. A GMC motion compensation data load operations completion would indicate the GO queue has been advanced and the software 101 normally continues to check the queue depth.

The block 108 normally generates the individual sub-pel warping address used by the SDRAM controller 104. The block 108 may also generate the actual SDRAM request, which would be arbitrated as a normal request on the bus MBUS. Such a request would normally have a priority at the same level of the normal motion compensation data load.

The addresses presented by the address generator 108 may be generated in other than raster order, since a complicated warp vector may span across many different pages. The address generator 108 normally attempts to generate all the accesses within the same SDRAM page. The address generator 108 then moves on first horizontally and then vertically for other pixels of the current macroblock.

Figure 6:
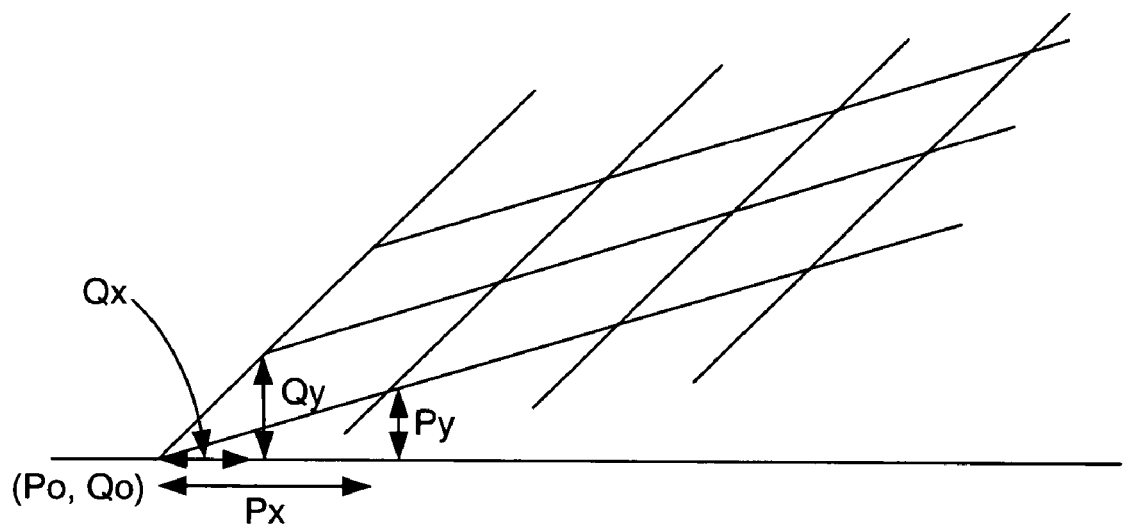
FIG. 6 is a diagram illustrating address generation.

Referring to FIG. 6, a diagram illustrating the address generation process used in the circuit 108 is shown. The address generation process may be implemented by adding an initial vector (Po, Qo) at the lower left corner of the current macroblocks with another pre-programmed increment parameters Px, Py, Qx, Qy. The embedded processor 105 would pre-calculate the initial vector (Po, Qo) and all of the increments to be programmed into the generator 108 as mapped by the registers in the block 106. The registers in the block 106 may also have a four deep queue. The address generator 108 may be implemented as one or more simple adders. When the adders are programmed with the base address (e.g., Po, Qo), the pre-programmed increment parameters Px, Py, Qx, Qy may be generated for all of the locations of the warping image data address. An example of these locations are shown as grid lines in FIG. 6.

The address generator 108 would normally (i) compare the current SDRAM burst address, (ii) compare several neighboring pixel addresses on the fly, and (iii) update an internal score board when any neighboring pixels are also obtained by the current data fetch. Such a procedure may be used to minimize redundant accesses to the SDRAM 103 for the same data when the pixels are sitting close to the current pixels.

If the warp vector is small, then many neighboring pixels generally fall into the same burst. In general, the more pixels included in a burst, the more the overall bandwidth for the SDRAM 103 is increased. Partitioning tasks may use the software 101 to generate the initial addresses and increment an index. The software 101 allows the hardware 106 and 108 to have very similar implementations for supporting warp points of 1, 2 or 3. The hardware 106 and 108 includes one or more adders which provide an implementation with the advantages of (i) allowing software to calculate potentially complicated initial index and increment index (which may be performed once per frame) and (ii) using simple adders to generate the actual warp address on the fly. Implementing hardware common to a number of blocks typically simplifies the overall design of the system 100.

The output of the SDRAM controller 104 is stored inside the circuit 110. The circuit 110 may be implemented, in one example, as a multi-port RAM configured to store different neighboring pixels (cherry) into different rows. An address comparator within the address generator 108 may send the address comparison results to the multi-port RAM circuit 110 to collect the cherry across a different pixel row and column. The circuit 110 may include logic configured to monitor data returned from the SDRAM controller 104. The address of the returned data is normally matched with the grid point address computed by the address generator 108. If a match occurs, the data may be stored in the multi-port RAM circuit 110. If the data returned does not match the addresses generated from the address generator 108, the returned data will be discarded.

The sub-pel interpolator circuit 112 may implement sub-pel interpolation within the GMC decoder, rather than inside the VDSP 132. The sub-pel interpolator circuit 112 may interpolate a new pixel data that may sit in an empty space between four surrounding original pixels. The interpolation process is complete when the weighted average of four surrounding pixels is calculated around the empty space of the new pixel. The weighted average is inversely proportional to the distance of the new pixel and the four surrounding original pixels. An illustration of the interpolation process is shown in FIG. 3. The number of surrounding pixels used to determine the weighted average may be varied to meet the design criteria of a particular implementation.

Figure 7:
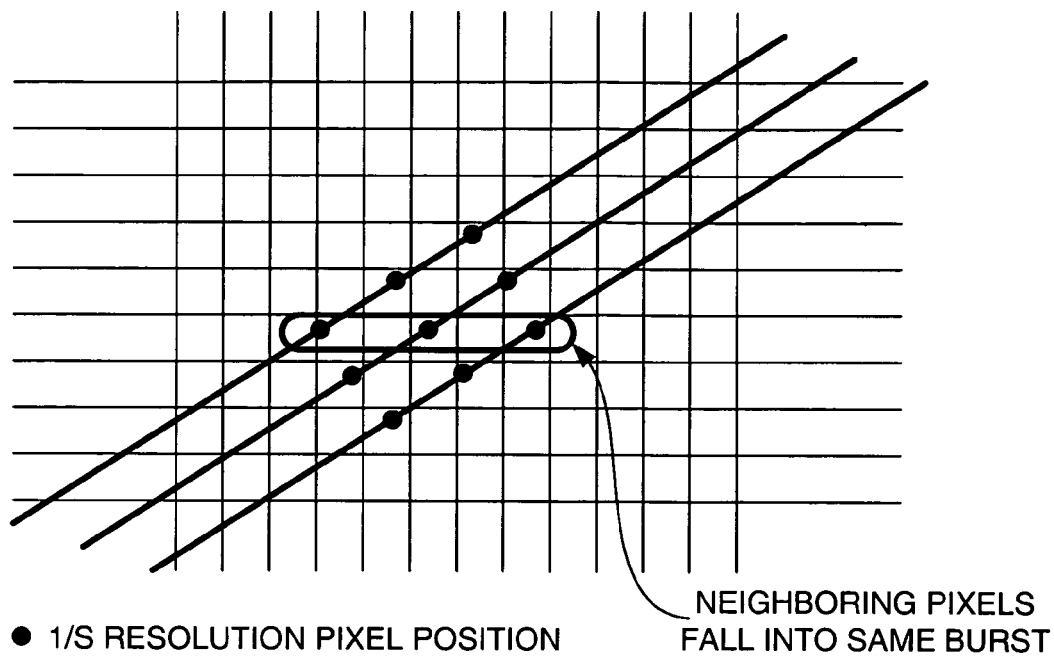
FIG. 7 is a diagram illustrating address generation with neighboring address comparison.

Referring to FIG. 7, an example illustrating the sub-pel address (F(i, j), G(i, j)) as different pixel to pixel ratios and the scaling ratios (ri, rj) is shown. If the interpolation is done within the VDSP 132, then every pixel ratio needs to be communicated between the VDSP 132 and the SDRAM 103 through the bus MBUS or the bus CBUS which would take more bandwidth than the data themselves. Another solution is to duplicate the address generation logic in the VDSP 132, but this makes the architecture more complicated. The present invention may perform the interpolation within the GMC decoder block 102.

Figure 8:
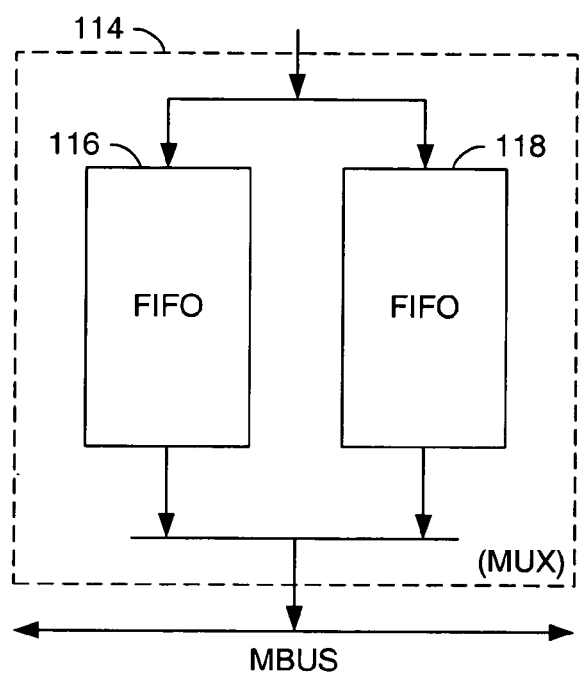
FIG. 8 is a diagram of a data packer (double buffer)

Referring to FIG. 8, a diagram of a data packer (double buffer) is shown. The data packer circuit 114 generally comprises a block (or circuit) 116 and a block (or circuit) 118. The block 116 may be implemented as a first buffer circuit. The block 118 may be implemented as a second buffer circuit. The first buffer circuit 116 and the second buffer circuit 118 may be implemented in a double-ping pong configuration. The first buffer circuit 116 and the second buffer circuit 118 may be implemented as FIFO buffers. The data packer circuit 114 may be configured to store both luma and chroma data. The data packer circuit 114 generally stores the output of the sub-pel interpolator 112 in a regular 16×16 (luma) or 8×8 (chroma) format before transfer back to the bus MEMBUS. The format of the luma or chroma data may vary to meet the design criteria of a particular implementation. The double buffering allows the next macroblock cherry picking operation to begin while the current macroblock data is still being transferred. The data packer circuit 114 may be implemented to store data from the multi port RAM circuit 110. In particular, the data packer circuit 114 may pack the data stored in the internal memory of the multi-port RAM circuit 110. The data packer circuit 110 may distribute the data (e.g., the data captured during the cherry picking process) to the VDSP 132. The transfer of data from the data packer circuit 114 to the VDSP 132 normally occurs through the bus MBUS. The transfer is normally done by a normal load strip data operations.

The system 100 may de-couple the reference pixels address formula into complicated global parameters that do not change for the entire frame. A simple mathematic calculation that depends on current pixel location may also be used. The complicated global parameters are pre-calculated by software 101, and programmed into the register 106. The address generator 108 calculates reference pixel address, by adding the pre-calculated global parameters with constant local offsets (offsets do not change for entire frame, and thus is pre-calculated by software also). Thus, the task is partitioned into a software process 101 and a hardware process (e.g., 122). When a reference pixel is being loaded from the memory 104, data located in the same memory row (e.g., with same RAS address) would also be fetched. The multi-port RAM 110 automatically checks these extra pixels to determine if an address matches with those of neighboring pixels that need to be fetched in future. A pixel with a matched address would also be saved. This process is called "cherry picking". The sub-pel interpolator 112 may perform the sub-pixel interpolation process, before sending the final calculated pixels to other processing units. Since the interpolated pixels, rather than the original raw pixels are sent, internal data bus bandwidth usage is reduced.

Referring to FIG. 9, a block diagram of a system 200 is shown illustrating components of a compressed video system. In general, a content provider 202 presents video image, audio or other data to be compressed and transmitted in a data stream 204 to an input of an encoder 206. The encoder 206 may be configured to generate a compressed bit stream 208 in response to the input stream 204. In one example, the encoder 206 may be configured to encode the data stream 204 according to one or more encoding standards (e.g., MPEG-1, MPEG-2, MPEG-4, WMV, WM9, VC-9, VC-1, H.262, H.263, H.264, H.264/JVC/AVC/MPEG-4 part 10, AVS 1.0 and/or other standards for compression of audio-video data). The encoder 206 may be further configured to generate the bit stream 208 using a quantization process implemented with support for default and custom scaling matrices. The encoder 208 may configured to support the decoder architecture 100, which includes global motion compensation (GMC).

The compressed bit stream 208 from the encoder 206 may be presented to an encoder transport system 210. An output of the encoder transport system 210 generally presents a signal 212 to a transmitter 214. The transmitter 214 transmits the compressed data via a transmission medium 216. In one example, the content provider 202 may comprise a video broadcast, DVD, internet connection, a hard disc, USB or firewire. The transmission medium 216 may comprise, for example, a broadcast, cable, satellite, network, DVD, hard drive, or any other medium implemented to carry, transfer, and/or store a compressed bit stream.

On a receiving side of the system 200, a receiver 218 generally receives the compressed data bit stream from the transmission medium 216. The receiver 218 presents an encoded bit stream 220 to a decoder transport system 222. The decoder transport system 222 generally presents the encoded bit stream via a link 224 to a decoder 226. The decoder 226 generally decompresses (decodes) the data bit stream and presents the data via a link 228 to an end user hardware block (or circuit) 230. The end user hardware block 230 may comprise a television, a monitor, a computer, a projector, a hard drive, a personal video recorder (PVR), an optical disk recorder (e.g., DVD), a plasma/flat panel TV, a hard disc (e.g, TIVO application), a DVI/HDMI transmitter and an analog TV interface or any other medium implemented to carry, transfer, present, display and/or store the uncompressed bit stream (e.g., decoded video signal). While described in the context of MPEG-4, the present invention may be used in other types of image systems that use warping.

The function performed by the software 101 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMS, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a video digital signal processor configured to generate a decoded video signal in response to a coded video signal and global motion compensated image data;
a video memory storing a reference image used in generating said decoded video signal;
a processor configured to generate an initial vector and a plurality of increment parameters in response to a number of warp points and one or more warp vectors, wherein said initial vector and said plurality of increment parameters are fixed for an entire frame;
a memory controller configured to retrieve data from said video memory in response to one or more warping addresses; and
a global motion compensation circuit connected to (i) said processor by a first bus, (ii) said memory controller by a second bus, and (iii) said video digital signal processor by a third bus, wherein said global motion compensation circuit comprises (i) a register configured to receive said number of warp points, said one or more warp vectors, base, row and column offsets of a current warp reference frame, said initial vector and said plurality of increment parameters via the first bus, (ii) a warping address generator circuit configured to generate said one or more warping addresses in response to said initial vector and said plurality of increment parameters and present said warping addresses along with a memory request directly to said memory controller via the second bus, (iii) a cherry picker circuit configured to (a) receive a current data fetch returned from said memory controller, (b) store retrieved reference pixels in said current data fetch that match neighboring pixel addresses of said warping addresses and (c) discard retrieved reference pixels in said current data fetch that do not match neighboring pixel addresses of said warping addresses, (iv) a sub-pixel interpolator configured to interpolate new pixel data using stored retrieved reference pixels, and (v) a data packer circuit configured to accumulate an output of said sub-pixel interpolator for presentation as said global motion compensated image data, said global motion compensated image data being presented to said video digital signal processor via said third bus.

2. The apparatus according to claim 1, wherein said warping vectors are processed using software executed by said processor and said warping addresses are generated in hardware.

3. The apparatus according to claim 2, wherein the same hardware is used for generating warping addresses for one, two, and three warp points.

4. The apparatus according to claim 1, wherein:
said first bus comprises a control bus and said register is mapped to a control bus address space programmed by said processor; and
said third bus comprises a memory bus.

5. The apparatus according to claim 1, wherein
said cherry picker circuit and said warping address generator circuit are configured to compare a current burst address of reference pixels retrieved from said video memory with the neighboring pixel addresses of the current warp reference frame and update an internal score board of the global motion compensation circuit when any neighboring pixels are obtained in the current data fetch.

6. The apparatus according to claim 1, wherein said warping address generator circuit includes one or more adders configured to generate said one or more warping addresses by adding said initial vector with said increment parameters to a lower left corner of a current macroblock.

7. The apparatus according to claim 1, wherein said cherry picker circuit includes a multiport RAM configured to (i) monitor data returned from said memory controller, (ii) store data that matches said warping addresses and (iii) discard data that does not match said warping addresses.

8. The apparatus according to claim 1, wherein said data packer circuit is configured to store luma and chroma data.

9. The apparatus according to claim 8, wherein said data packer circuit includes a double buffer data packer configured to (i) store data that matches said warping addresses and (ii) transfer said data as burst data on said third bus connecting said global motion compensation circuit to said video digital signal processor.

10. The apparatus according to claim 4, wherein said processor is further configured to (i) read the contents of said register via said control bus and (ii) record an average motion vector for future use.

11. The apparatus according to claim 1, wherein said global motion compensation circuit is implemented as a part of said memory controller and said memory controller is separated from said processor and said video digital signal processor by said first and third busses, respectively.

12. An apparatus comprising:
means for generating a decoded video signal in response to a coded video signal and global motion compensated image data;
means for controlling a video memory, wherein said video memory stores a reference image used in generating said global motion compensated image data and said video memory controlling means is configured to retrieve data from said video memory in response to one or more warping addresses;
means for generating said global motion compensated image data comprising (i) means for storing a number of warp points, one or more warping vectors, and base, row and column offsets of a current reference frame, an initial vector and a plurality of increment parameters, (ii) means for generating said one or more warping addresses in response to said initial vector and said plurality of increment parameters and presenting said warping addresses and a memory request directly to said video memory controlling means, (iii) means for selecting and storing data configured to (a) receive a current data fetch returned from said memory controlling means, (b) store retrieved reference pixels in said current data fetch that match neighboring pixel addresses of said warping addresses and (c) discard retrieved reference pixels in said current data fetch that do not match neighboring pixel addresses of said warping addresses, (iv) means for interpolating sub-pixel data configured to interpolate new pixel data using stored retrieved reference pixels, and (v) means for accumulating an output of said sub-pixel interpolating means for presentation as said global motion compensated image data, and (vi) means for presenting said global motion compensated image data to said decoded video signal generating means.

13. A method for implementing global motion compensation in a video system, comprising the steps of:
(A) generating a decoded video signal in response to a coded video signal and global motion compensated image data using a video digital signal processor;
(B) storing a reference image used to generate said global motion compensated image data in a video memory;
(C) receiving base, row and column offsets of a current warp reference frame, a number of warp points and one or more warp vectors;
(D) generating an initial vector and a plurality of increment parameters in response to said number of warp points and said one or more warp vectors, wherein said initial vector and said plurality of increment parameters are fixed for an entire frame;
(E) programming a control register of a global motion compensation circuit with said initial vector and said plurality of increment parameters;
(F) generating one or more warping addresses in response to said initial vector and said plurality of increment parameters, wherein said one or more warping addresses are (i) generated in hardware, (ii) presented along with a memory request directly to a memory controller configured to retrieve data from said video memory in response to said one or more warping addresses;
(G) generating said global motion compensated image data from the data retrieved from said video memory by (a) receiving a current data fetch returned from said video memory, (b) storing retrieved reference pixels in said current data fetch that match neighboring pixel addresses of said warping addresses, (c) discarding retrieved reference pixels in said current data fetch that do not match neighboring pixel addresses of said warping addresses, (d) performing sub-pixel interpolation to interpolate new pixel data using stored retrieved reference pixels, and (e) accumulating the sub-pixel interpolated new pixels for presentation as said global motion compensation image data; and
(H) communicating said global motion compensated image data from said global motion compensation circuit to said video digital signal processor via a memory bus operation.

14. The method according to claim 13, wherein:
said warping vectors are processed using software executed on a processor to generate said initial vector and said plurality of increment parameters; and
said warping addresses are generated in hardware.

15. The method according to claim 13, wherein steps (E) and (F) further comprise:
mapping said control register of said global motion compensation circuit to a control bus address space programmed by an embedded processor; and
generating said warping addresses using the same hardware for one, two, and three warp points.

16. The method according to claim 15, further comprising generating said warping addresses with adders programmed with one or more base addresses and pre-programmed increment parameters.

17. The method according to claim 13, wherein step (G) further comprises:
monitoring said warping addresses with a multiport RAM to (i) store data that matches said warping addresses and (ii) discard data that does not match said warping addresses.

18. The method according to claim 13, further comprising:
interpolating new pixel data with a sub-pixel interpolator.

19. The method according to claim 18, further comprising:
taking a weighted average of two or more pixels surrounding said new pixel, wherein the average is inversely proportional to the distance between said new pixel and said two or more pixels.

20. The method according to claim 13, wherein step (H) further comprises:
storing data that matches said warping addresses in a double buffer data packer to transfer said data to said video digital signal processor as burst data on a memory bus.

* * * * *